May 22, 1934.    E. JANIK    1,959,476
ADJUSTING MECHANISM FOR VARIABLE SPEED GEARS
Filed Jan. 3, 1933    3 Sheets-Sheet 2
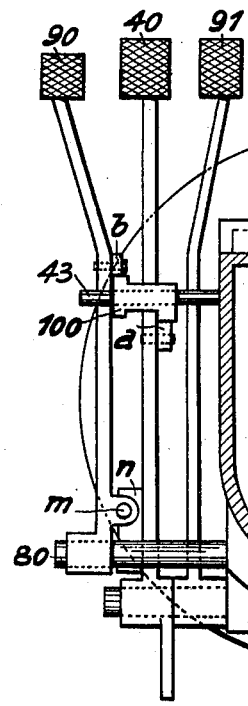
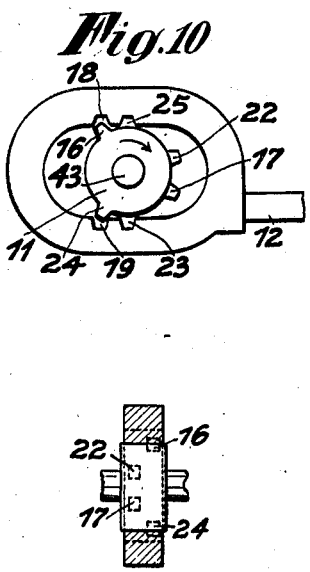
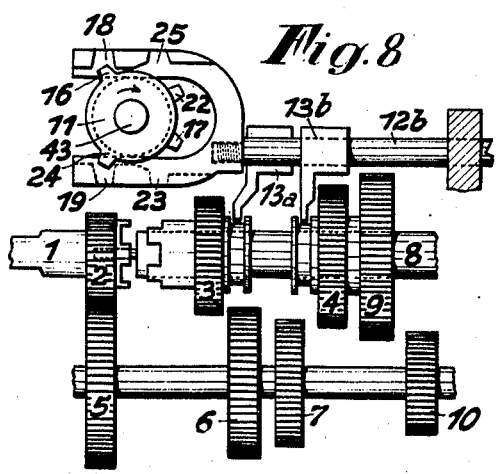
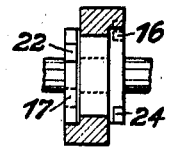

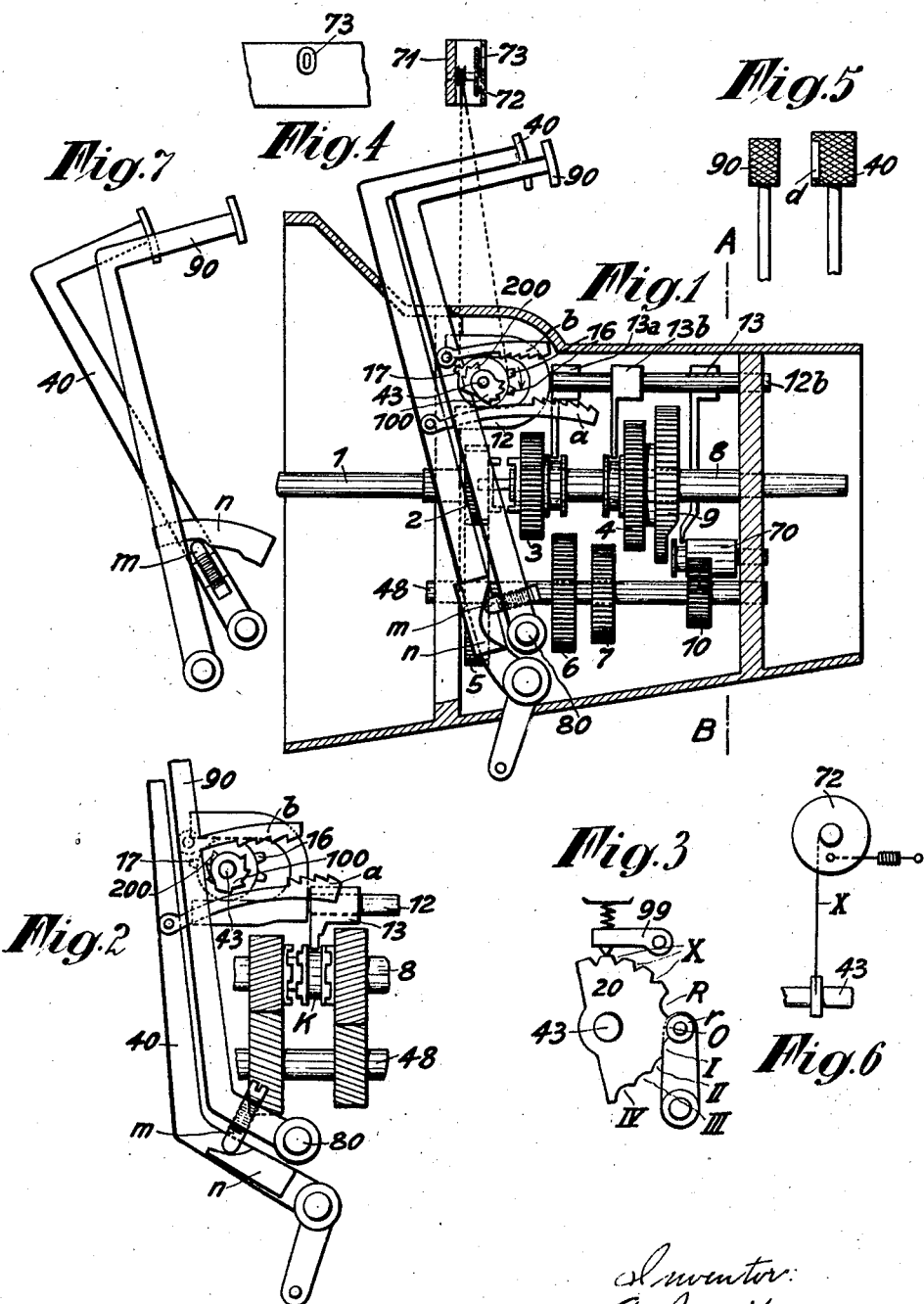

May 22, 1934.  E. JANIK  1,959,476
ADJUSTING MECHANISM FOR VARIABLE SPEED GEARS
Filed Jan. 3, 1933  3 Sheets-Sheet 3
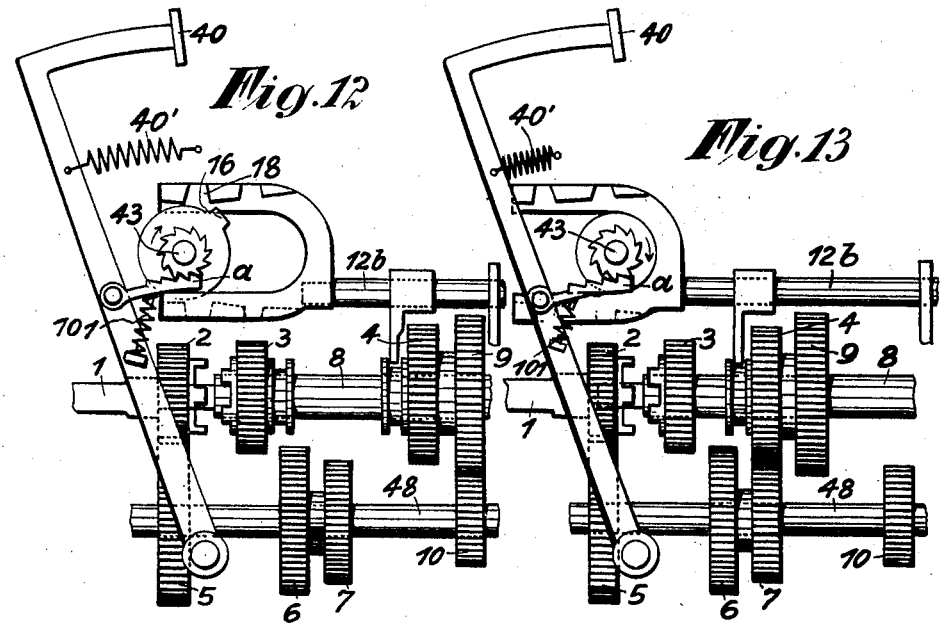
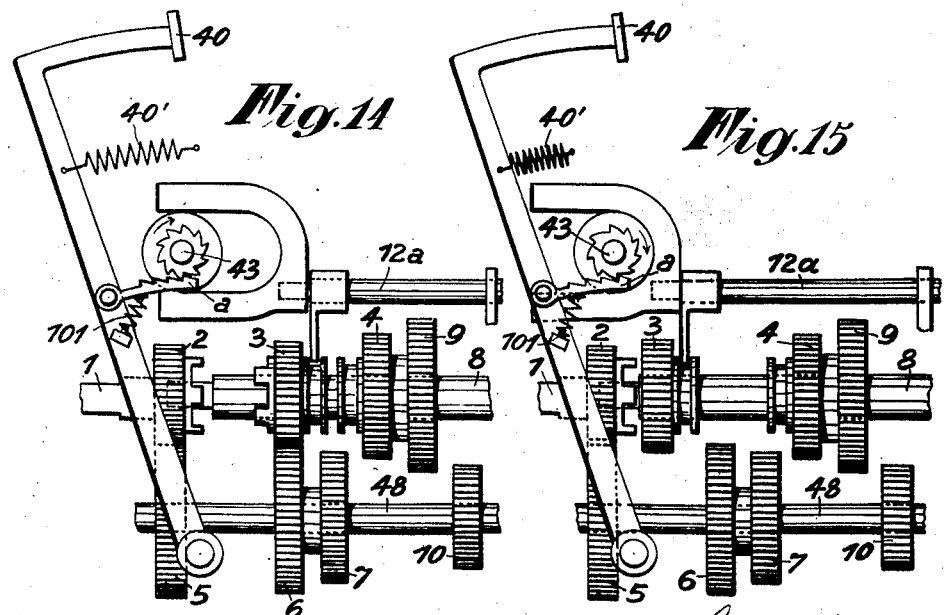

Patented May 22, 1934

1,959,476

UNITED STATES PATENT OFFICE 1,959,476

ADJUSTING MECHANISM FOR VARIABLE SPEED GEARS

Eduard Janik, Vienna, Austria

Application January 3, 1933, Serial No. 650,011
In Austria April 4, 1932

9 Claims. (Cl. 74—81)

My invention relates to an adjusting mechanism, for variable speed gears used in motor vehicles, modern motor cars and composed of toothed wheels in permanent engagement and axially movable clutch sleeves. This invention is a further development and an improvement intended to simplify the automatic variable speed gear disclosed and claimed in my prior U. S. Patent No. 1,828,606. The essence of my present invention consists in that the speed increasing adjustment takes place whenever the clutch lever is depressed beyond the normal extent, whereas the speed decreasing adjustment is effected by depressing a separate speed decreasing treadle.

The usual adjusting hand lever being dispensed with and the toothed wheels and clutch sleeves coming into engagement with each other being synchronized, the driver is greatly relieved and as he has full control over the steering at all times, the traffic safety on the streets and roads is greatly increased.

In the drawings Fig. 1 is a side elevation partly in section of an embodiment of the present invention. Figs. 2 to 11 show details of Fig. 1, Figs. 12 to 15 show the speed adjusting mechanism in various positions and Fig. 16 is a section on the line A B Fig. 1. The toothed wheels 3, 4, 9 revolve with the driven shaft 8 and the toothed wheels 5, 6, 7, 10 revolve with the intermediate shaft 48 as usual.

For the first speed the toothed wheels 2, 5, 10, 9 are in the position shown in Fig. 12, for the second speed the toothed wheels 2, 5, 7, 4 are in the position shown in Fig. 13, for the third speed the toother wheels 2, 5, 6, 3 are in the position shown in Fig. 14, for direct running the toothed wheels 2 and 3 are brought into clutch engagement with each other, as shown in Fig. 15.

The adjusting shaft 43 causes by means of the teeth 16 and 17 secured thereto, the push bars 12, 12a, 12b to be shifted together with the actuating arms 13, 13a, 13b. The latter shift the toothed wheels 3, 4, 9 along the shaft 8, Figs. 1 and 12 to 15, of the variable speed gear, the said toothed wheels 3, 4, 9 being locked against rotation around the shaft. In case of variable speed gears the toothed wheels of which are in permanent engagement, the actuating arms shift clutch sleeves K, as shown in Fig. 2, in connection with one actuating arm 13.

On the shaft 43 is fast a segment 20, Fig. 3, provided with notches R, O, I, II, III, IV. An elastic ball or a resiliently mounted roller r is forced against this segment for yieldingly holding the variable speed gear in the positions of backward running, idle running and of the first, second, third, and fourth speed respectively.

Furthermore on the shaft 43 a toothed segment 100, Figs. 1 and 2, is fast which by means of the spring actuated toothed segment a pivoted to the clutch treadle 40 causes the shaft 43 to turn in the direction for increasing the speed, while the toothed segment 200 fast on the shaft 43 causes the latter to turn in the direction for decreasing the speed by means of the spring actuated toothed segment b pivoted to the speed decreasing treadle 90.

The speed is increased in the following manner:

In Fig. 1 the variable speed gear is shown in the position for idle running. For starting the clutch treadle 40 is depressed whereby in the first place the clutch is disengaged and the toothed segment a approaches the toothed segment 100. On further depressing the clutch treadle the toothed segments a and 100 come into engagement with each other and the variable speed gear is adjusted for the first or second speed, the shaft 43, being turned in the direction of the arrow. After releasing the treadle 40 it is returned into its normal position by its spring 40' without turning the shaft 43 the teeth thereon and the teeth on the segment 100, engaging therewith having properly inclined backs and the segment a yielding against the action of its spring 101, this position is shown in Fig. 12. The vehicle is thus started. On again depressing the clutch treadle 40 the clutch is in the first place again disengaged and then the gear is adjusted for the third or the fourth speed. This is brought about in the manner disclosed in my said prior patent the teeth on the disc 11 fast on the shaft 43 and the corresponding notches on the slotted ends of the push bars 12, 12a, 12b being properly arranged. These positions are shown in Figs. 13, 14 and 15.

The speed decreasing treadle 90 pivoted at 80 serves for decreasing the speed. The toothed segment b turns the shaft 43 by means of the toothed segment 200 in a direction opposite to that indicated by the arrow. Hence on depressing the treadle 90 starting from the adjustment for direct running, the variable speed gear may be adjusted for the third, second, first speed, for idle and for backward running in succession, the shape and cooperation of the teeth on the shaft 43 and on the toothed segment b being the same as above described for an adjustment for increasing speeds.

The synchronizing on adjusting for increasing speeds is brought about by first disengaging the clutch and before the toothed wheels or clutch sleeves are brought into engagement with each other, the usual gas lever, not shown, is released and thereby the speed gear is adjusted for idle running for a short time for reducing the speed of the driving shaft to such an extent that a smooth engagement of the toothed wheels or the clutch sleeves with each other is secured.

For this purpose in the segment 20 Fig. 3 are provided recesses $x$ into which an arm 99 is adapted to be forced by a spring. These recesses correspond to the positions for idle running of the toothed wheels or clutch sleeves between speeds. On depressing the treadle 40 the driver feels the idle running by the resistance due to the arm 99 and retards for quite a short time the further depression of treadle 40. During this short time the driving shaft 1 and the intermediate shaft 48 retard their movements for the purpose of securing on further depressing the said treadle a noiseless, smooth engagement of the then more slowly revolving toothed wheels or clutch sleeves axially slidable on the shaft 8.

When running up-hill the synchronizing for decreasing speeds takes place as follows:

On the speed reducing treadle is provided an adjustable stop for instance a screw $m$ adapted to engage a cam $n$ on the clutch treadle 40. The surface of the cam $n$ is so shaped that on depressing the treadle 90 the treadle 40 causes a slight disengagement of the clutch. Thereby the speed of the driving shaft 1 thus partly relieved and also the speed of the shaft 48 are increased, the position of the gas lever and hence also the gas supply remaining unaltered. Thus the speeds of the toothed wheels or clutch sleeves on the shafts 8 and 48 coming into engagement with each other become nearly equal whereby on depressing the treadle 90 at a moderate rate a noiseless adjustment for a reduced speed is brought about. The stop $m$ might be provided on the treadle 40 and the cam $n$ on the treadle 90 as shown in Fig. 7.

For the short stoppings in the traffic of great cities the gas treadle is released and first the brake treadle 91 and just before stopping the treadle 90 are depressed. The angular speed of the shafts 1, 8, and 48 greatly reduced thereby permits of a smooth and very rapid reduction of the speed beginning from any speed adjustment whatever through all speeds to the first one or to idle running. The shape of the lower part of the cam $n$ is for this purpose such that on fully depressing the treadle 90 the disengagement of the main clutch required for such short stoppings is brought about.

For the backward running the toothed wheel 70 is thrown into engagement with the toothed wheels 9 and 10 by fully depressing the treadle 90.

For preventing the simultaneous depression of both treadles 40 and 90 the treadle 40 may be provided with a projecting rib $d$, Fig. 5, as a stop for the foot.

For indicating the leverage which is adjusted at any time, a disc 72 is provided on the board 71 and is operated as shown in Figs. 1 and 4 from the shaft 43 by means of a chain $w$. In a window 73 on the board 71 the speed for which adjustment has been made is then indicated by a number or otherwise.

According to Fig. 6 for the same purpose a cord X or other flexible pulling element is used which is secured to the shaft 43 and actuates the disc 72 against the action of a spring, whenever the variable speed gear is adjusted for increasing speeds.

The invention may also be applied for adjusting the variable speed gear to three or five different speeds.

For enabling the toothed wheels 4 and 9 to be shifted by one and the same push bar according to Figs. 1 and 2 the following arrangement is provided. The push bar 12$b$ shown in Fig. 1 in the position for idle running is intended to adjust the variable speed gear for the first speed, for idle running, for the second speed and for idle running in succession, when the shaft 43 is turned in the direction of the arrow.

On so turning the shaft 43 the tooth 16 engages into the notch 18 whereby the toothed wheel 9 is brought into engagement with the toothed wheel 10, this is the adjustment for the first speed. On continuing this movement of the shaft 43 the tooth 17 engages into the notch 19 and brings the push bar 12$b$ together with the wheel 9 into the idle running position shown. As the shaft is further turned in the same direction the tooth 22 engages into the recess 23 whereby the toothed wheel 4 is brought into engagement with the toothed wheel 7; the variable speed gear being then adjusted for the second speed. As the shaft 43 continues to turn in the same direction the tooth 24 engages into the recess 25 thereby returning the toothed wheels 4 and 9 into the desired position for idle running.

As the shaft 43 continues to turn in the direction of the arrow the variable speed gear is adjusted for the third and fourth speed as may be seen from Figs. 12 to 15.

According to Figs. 10 and 11 the toothed part of the push bar 12$b$ resembles a rack the toothed disc 11 provided with teeth 16, 17, 22, 24 engages the notches 18, 19, 23, 25 in succession, thereby adjusting the variable speed gear for the first speed, idle running, the second speed and idle running respectively, but in the disc 11 associated to the push bar 12$b$ Figs. 10 and 11, any desired number of teeth may be provided.

Obviously on turning the shaft 43 in the opposite direction the variable speed gear is adjusted for the third, second, first speed and idle running in succession.

According to Fig. 10 the forked part of the push bar 12$b$ is closed to form an elongated slot so that the improved adjusting mechanism may also be mounted in existing variable speed gears.

The segment 20 can be dispensed with if the push bars 12, 12$a$, 12$b$ are retained in the positions which they occupy at any time in the manner usual in variable speed gears, with toothed wheels, for instance by elastic balls.

What I claim is:

1. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a resilient toothed segment pivoted to the said clutch treadle and pivoted to the said speed reducing treadle, a shaft, toothed segments fast on the said shaft, one each of the said resilient segments and adapted to engage with the said two resilient segments, the said shaft being adapted to engage with any one of the said push bars, the said shaft being provided with a plurality of sets of teeth one for each push bar and said push bars being provided with as many sets of recesses each associated to and adapted to engage with one set of teeth of the said shaft whereby the speed of the variable speed gear is successively increased on repeatedly depressing the said clutch treadle and is successively decreased on repeatedly depressing the said speed decreasing treadle.

2. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a resilient toothed segment pivoted to the said clutch treadle and pivoted to the said speed reducing treadle, a shaft, toothed segments fast on the said shaft, one for each of the said resilient segments and adapted to engage with the said two resilient segments, the said shaft being adapted to engage with any one of the said push bars the said shaft being provided with a plurality of sets of teeth one for each push bar and said push bars being provided with as many sets of recesses each associated to and adapted to engage with one set of teeth of the said shaft whereby the speed of the variable speed gear is successively increased on repeatedly depressing the said clutch treadle and is successively decreased on repeatedly depressing the said speed decreasing treadle in combination with a segment provided with one series of notches, the said notched segment being fast on the said shaft and means comprising a resilient roller adapted to engage with any one of the notches of the said notched segment for yieldingly locking the said shaft in positions corresponding to the various speeds.

3. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a resilient toothed segment pivoted to the said clutch treadle and pivoted to the said speed reducing treadle, a shaft, toothed segments fast on the said shaft, one for each of the said resilient segments and adapted to engage with the said two resilient segments the said shaft being adapted to engage with any one of the said push bars the said shaft being provided with a plurality of sets of teeth one for each push bar and said push bars being provided with as many sets of recesses each associated to and adapted to engage with one set of teeth of the said shaft whereby the speed of the variable speed gear is successively increased on repeatedly depressing the said clutch treadle and is successively decreased on repeatedly depressing the said speed decreasing treadle in combination with a segment provided with one series of notches, the said notched segment being fast on the said shaft and means comprising a resilient roller adapted to engage with any one of the notches of the said notched segment for yieldingly locking the said shaft in positions corresponding to the various speeds, the said segment being provided with a second series of notches and means comprising a resilient roller adapted to engage with any of the notches of the said second series for yieldingly locking the said shaft in any of the positions intermediate those corresponding to the various speeds.

4. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connectd to the said clutch, a speed decreasing treadle, push bars and actuating arms carried by the said push bars for throwing into and out of engagement the said toothed wheels on the said driven shaft with the said associated toothed wheels on the said intermediate shaft, a shaft operatively connected with the said clutch treadle and the said speed decreasing treadle and adapted to engage with any one of the said push bars the said shaft being provided with a plurality of sets of teeth one for each push bar and said push bars being provided with as many sets of recesses each associated to and adapted to engage with one set of teeth of the said shaft whereby the speed of the variable speed gear is successively increased on repeatedly depressing the said clutch treadle and is successively decreased on repeatedly depressing the said speed decreasing treadle, the said clutch treadle and the said speed decreasing treadle being provided with cooperating means one of which is adjustable for slightly disengaging the said clutch whenever the said speed decreasing treadle is depressed.

5. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a shaft operatively connected with the said clutch treadle and the said speed decreasing treadle and adapted to engage with any one of the said push bars the said shaft being provided with a plurality of sets of teeth one for each push bar and such push bars being provided with as many sets of recesses each associated to and adapted to engage with one set of teeth of the said shaft whereby the speed of the variable speed gear is successively increased on repeatedly depressing the said clutch treadle and is successively decreased on repeatedly depressing the said speed decreasing treadle, the said clutch treadle being provided with a stop for preventing the simultaneous depression of both of the said treadles.

6. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a shaft operatively connected with the said clutch treadle and the said speed decreasing treadle, and adapted to engage with any one of the said push bars, the said shaft being provided with a plurality of sets of teeth one for each push bar and said push bars being provided with as many sets of recesses each associated to and adapted to engage with one set of teeth of the said shaft whereby the speed of the variable speed gear is successively increased on repeatedly depressing the said clutch treadle and is successively decreased on repeatedly depressing the said speed decreasing treadle, in combination with a disc operatively connected to the said shaft for indicating the speed for which the variable speed gear is adjusted at any time.

7. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a shaft operatively connected with the said clutch treadle and the said speed decreasing treadle, toothed discs fast on the said shaft one for each of the said push bars, each of the said toothed discs constituting a set of teeth fast on the said shaft, each of the said push bars having forked ends embracing the said discs associated thereto and being provided at the forked ends with recesses constituting sets of teeth adapted to engage with the associated ones of the said toothed discs whereby the speed of the variable speed gear is successively increased on repeatedly depressing the said clutch treadle and is successively decreased on repeatedly depressing the said speed decreasing treadle.

8. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the intermediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a shaft operatively connected with the said clutch treadle and the said speed decreasing treadle, toothed discs fast on the said shaft one for each of the said push bars, each of the said toothed discs constituting a set of teeth fast on the said shaft each of the said push bars having forked ends embracing the said discs associated thereto and being provided at the forked ends with recesses constituting sets of teeth, the said forked ends of the push bars being closed at their free ends.

9. In an adjusting mechanism for variable speed gears for motor vehicles comprising a driving shaft, a driven shaft, a clutch adapted to throw the said two shafts into and out of clutch engagement, an intermediate shaft, toothed wheels on the said intermediate shaft, a toothed wheel on the said driving shaft in permanent engagement with a toothed wheel on the inter- mediate shaft, toothed wheels on the said driven shaft and means for engaging any one of the toothed wheels on the said driven shaft with an associated toothed wheel on the said intermediate shaft, the last named means including a clutch treadle operatively connected to the said clutch, a speed decreasing treadle, push bars and actuating arms carried by the said push bars for throwing into and out of engagement the said toothed wheels on the said driven shaft with the said associated toothed wheels on the said intermediate shaft, a shaft operatively connected with the said clutch treadle and the said speed decreasing treadle, toothed discs fast on the said shaft, one for each of the said push bars, each of the said toothed discs constituting a set of teeth fast on the said shaft, each of the said push bars having forked ends embracing the said discs associated thereto and being provided at the forked ends with recesses constituting sets of teeth, one of the said push bars and the said toothed discs associated thereto being designed for adjusting the variable speed gear for the first and second speed gear whereby on turning the said shaft continuously in one direction and starting from idle running, the variable speed gear is adjusted for the first speed, idle running, the second speed and idle running in succession.

EDUARD JANIK.